United States Patent [19]

Jowett et al.

[11] 4,108,008

[45] Aug. 22, 1978

[54] QUICK CONNECT MULTIPLE FLUID/ELECTRICAL TRANSDUCER APPARATUS

[75] Inventors: Terence W. Jowett, Avon, Conn.; Harvey A. Smith, Hampden, Mass.

[73] Assignee: United Technologies Corporation, Hartford, Conn.

[21] Appl. No.: 845,510

[22] Filed: Oct. 26, 1977

[51] Int. Cl.² .............................................. G01L 7/00
[52] U.S. Cl. .................................................... 73/756
[58] Field of Search ............... 73/756, 714; 251/149.6, 251/149.7

[56] References Cited

U.S. PATENT DOCUMENTS

| | | | |
|---|---|---|---|
| 2,320,456 | 6/1943 | Frazer-Nash | 251/149.6 |
| 3,357,599 | 12/1967 | Douglas et al. | 251/149.7 |
| 3,960,019 | 6/1976 | Jakobsen | 73/714 |

*Primary Examiner*—Donald O. Woodiel

*Attorney, Agent, or Firm*—M. P. Williams

[57] ABSTRACT

Connection is quickly made to a plurality of fluid lines, the pressure or other non-flow characteristic of which is desired to be measured, by means of a vehicle mounted port block container valved access to a plurality of vehicle fluid lines and a matching transducer block having a corresponding plurality of transducer retaining bores correspondingly aligned for close fluid communication with one of the ports, each containing a pusher to open the valve of the related port and each containing a fluid-to-electric parameter transducer for measuring a parameter of fluid in a corresponding port, there being an electrical interconnection means, such as a cable, for carrying conductors to the transducers. A locking means provides for snugging the transducer block tightly against the port block and for locking the blocks together by two independent motions of a locking handle.

3 Claims, 2 Drawing Figures

QUICK CONNECT MULTIPLE FLUID/ELECTRICAL TRANSDUCER APPARATUS

BACKGROUND OF THE INVENTION

1. Field of Art

This invention relates to fluid testing and more particularly to providing ease of access to fluid lines for measuring parameters of fluid therein.

2. Description of the Prior Art

There are many circumstances which require determining one or more parameters of fluid in one or more fluid lines, such as fuel, hydraulic, or air pressure, or coolant temperature, or the like in vehicles such as trucks and buses. For instance, in modern vehicle diagnostics, it is desirable to be able to quickly connect test apparatus to a vehicle and test various parameters on a semiproduction line basis. This may be in final test at the manufacturing facility, or as an adjunct to maintenance of an operating fleet. In the past, it has been known to make quick disconnect electrical connection blocks in mated pairs, one of which is mounted on a vehicle and the other of which is connected to test apparatus; it has also been known to make quick disconnect hydraulic or fluid fittings for matching with corresponding ports attached in a tee configuration to varius fluid lines on the vehicle. The electrical case is easy, but in the case of the fluid lines, there still is a bundle of heavy fluid conduits, such as high pressure hoses, that must be handled in the test bed area. This is extremely cumbersome and can at times be messy. Also, long interconnecting fluid lines frequently have sufficient resilience so as to mask pressure pulses and to cause a delay in pressure or temperature changes which may occur. In addition, the longer a tee connection to a line the more difficult it is to measure parameters such as temperature and the like which are not readily communicated under non-flowing conditions. In most cases, the lines must be bled of all air or other fluid before reading the parameter of a fluid in an accurate fashion. Obviously, if long fluid conduits connecting a vehicle to test equipment, for instance, need be filled with the fluid to be tested from the vehicle, this will result in a certain depletion of the fluid each time that it is tested, at least by the amount required to ensure that the line has been fully purged of air or other fluid.

SUMMARY OF THE INVENTION

Objects of the present invention include provision of improved means for determining parameters in fluid lines, including increased accessibility and improvement in the reliability of parameter sensing.

According to the present invention, a plurality of fluid lines are connected to corresponding ports, each of which is disposed to be selectively placed in fluid communication with a corresponding plurality of fluid to electrical transducers for measuring parameters of the fluid and providing corresponding electrical signals in response thereto. The ports and transducers are respectively disposed on matching blocks adapted to be selectively aligned with one another so as to place each transducer in close fluid communication with a corresponding one of the ports, the port block being mounted on a vehicle or other structure containing the fluid lines connected to the ports and the parameters of which are desired to be tested, the transducer block being electrically connectible with apparatus for responding to the electrical signals from the transducers indicative of the parameters being measured, each port having a self-closing valve which is opened by engagement with a corresponding member in the transducer block when the two blocks are engaged, with means for securing the two blocks together. In further accord with the present invention, the means for securing the two blocks together comprises a simple connection means including a rotatable key on the transducer block fitting into a key slot of the port block and a handle means for rotating the key which also is provided with a cam surface for forcing the two blocks together when the key is engaged.

The invention provides rapid access to fluid lines. The invention also provides close transducer access to the fluid conditions in actual lines, minimizing the length of spur lines which can mask the parameters desired to be measured. The invention also eliminates the need for long fluid connections which through pressure and temperature response can mask the quality of parameters being sensed, and which otherwise need to be purged and loaded with the fluids to be measured.

The foregoing and other objects, features and advantages of the present invention will become more apparent in the light of the following detailed description of an exemplary embodiment thereof, as illustrated in the accompanying drawing.

DETAILED DESCRIPTION

Figure 1:
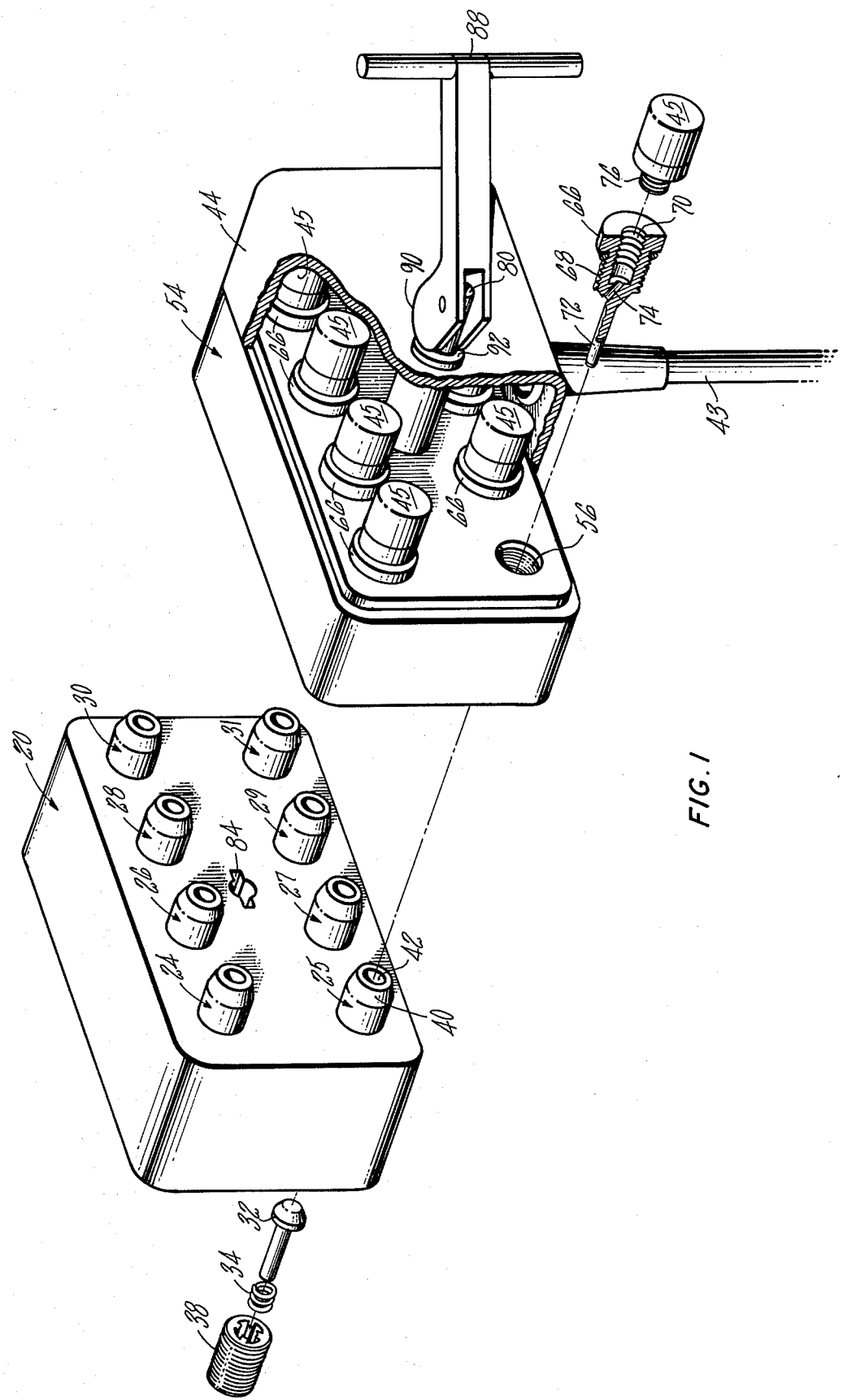
FIG. 1 is a partially sectioned and broken away, exploded perspective view of an embodiment of the invention.

Referring now to the drawing, a port block 20 mounted on a vehicle (or other structure containing fluid lines, parameters of the fluid in which is desired to be tested) contains a plurality of fluid ports 24–31 each of which includes a valve 32 resiliently urged against a valve seat 33 by a suitable means such as a spring 34 retained in an internally threaded chamber 36 of the port by an externally threaded, internally fluted insert 38. Each port also has an outwardly-extending, annular snout 40 defining a fluid passage port 42 which is in fluid communication with the chamber 36 between the flutes of the retaining insert 38 whenever the valve 32 is not adjacent the seat 33.

Figure 2:
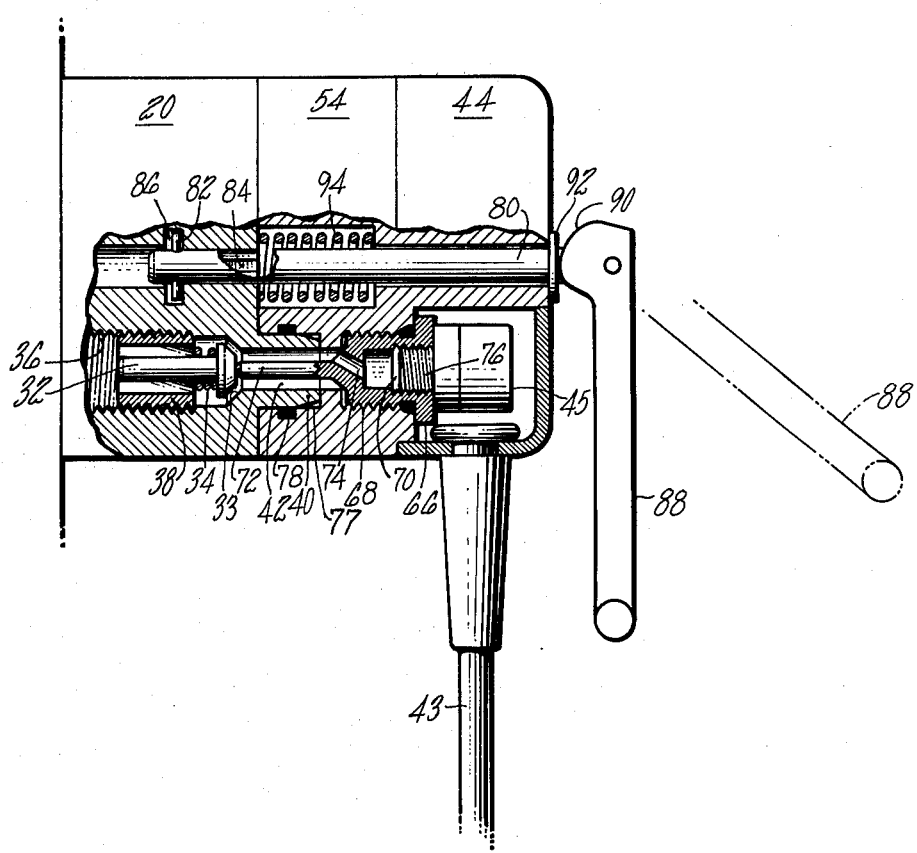
FIG. 2 is a partially sectioned side elevation view of the embodiment of FIG. 1.

The test equipment is connected by a cable 43 through a cover plate 44 to a plurality of transducers 45, each of which corresponds with one of the ports 24–31. The transducers 45 are disposed on a transducer block 54 which has a plurality of threaded bores 56 therein, each disposed for coaxial alignment with a corresponding one of the ports. Each of the bores 56 has an insert 66 threaded therein, each insert 66 including an externally threaded portion 68, an internally threaded hole 70 and a pusher 72 having a fluid communication hole 74 drilled through the base thereof to permit fluid communication from outside of the pusher 72 into the threaded hole 70. The threaded hole 70 engages corresponding threads 76 of the transducers 45. Each of the threaded holes 56 in the tester block is in fluid communication with a corresponding, coaxially aligned, oppositely disposed snout-receiving hole 77 (FIG. 2) which is provided with an annular groove to receive a suitable seal such as an O-ring 78 for engagement with the related one of the snouts 40. Each pusher 72 pushes the corresponding valve 32 away from its related valve seat 33 when the two blocks are engaged together as shown in FIG. 2.

Engagement of the port block 20 with the transducer block 54 is effected by means of a rotatable shaft 80 having a protrusion such as a pin 82 (FIG. 2) disposed therein so as to form a locking key arrangement, the block 20 having a keyway 84 formed therein which terminates in an annular groove 86 (FIG. 2) within which the pin is free to rotate in all directions. The shaft 80 has a tee bar handle 88 pivotably disposed at the end thereof, the tee bar handle including a cam surface 90 adapted for action against a washer or other surface 92. With the tee bar handle 88 positioned as shown in solid lines in FIG. 2, the cam surface 90 has drawn the pin 82 to the right (as shown in FIG. 2) against the surface of the annular groove 86 so as to pull the transducer block 54 tightly against the port block 20, with the pin 82 outside of the keyway 84 and in the annular groove 86. Additionally, since the pin 82 is within the annular groove and outside of the keyway 84, the transducer block 54 will reamin locked against the port block 20. As the transducer block is being inserted adjacent the port block, each of the pushers 72 push the related valve 32 out of engagement with the related valve set 22 so that there is full fluid communication from the chambers 36 (which are connected to fluid lines in the vehicle by conduits not shown) past the valve seats 33, around the pushers 72, through the fluid communication holes 74 and into the internal portion of the inserts 66 for fluid communication with the related ones of the transducers 45. Thus each transducer can monitor a parameter of the fluid line with which it is in communication. With the tee bar handle 88 positioned as shown in broken lines in FIG. 2, the cam surface 90 releases the tension between the locking pin 82 and the surface of the annular groove 86 so that the handle is easy to rotate to permit the pin to slip into the keyway, and the transducer block may be removed. To assist in this, there is shown a means, such as a spring 94, for resiliently urging the transducer block 54 away from the port block 20 when they are in close proximity. This helps to overcome the drag of the O-rings 78 from the snouts 40. The spring is captured on the shaft 80 by the pin 82.

Although not illustrated herein, the port block 20 may be attached to its related structure (such as a vehicle) by any suitable means such as machine screws, clips or adhesive bonding. Also, a suitable cover may be placed over the port block when the transducer block is not aligned therewith. This may be a simple shell and include a screw-like means to engage the key slot, or snap ears to retain it in place simply to keep excessive dirt from the ports. Eight transducers have been illustrated herein, but other numbers may be utilized if desired. The particular nature of each of the transducers 45 has not been described since these are well known in the art, and may be selected to suit any desired purpose. Each transducer may sense hydraulic, pneumatic or other fluid parameters, and each may either sense a discrete condition (such as a pressure or temperature limit) or may provide an analog signal indicative of the magnitude of a desired parameter (such as temperature or pressure). The nature of the transducers is not significant to the present invention, any transducer capable of operation in conjunction with one of the ports being suitable for use in the invention.

Similarly, although the invention has been shown and described with respect to an exemplary embodiment thereof, it should be understood by those skilled in the art that the foregoing and various other changes, additions and omissions may be made therein and thereto without departing from the spirit and the scope of the invention.

Having thus described a typical embodiment of our invention, that which we claim as new and desire to secure by Letters Patent is:

1. A quick disconnect, multiple fluid/electrical transducer apparatus comprising:

a port block comprising a plurality of ports adapted to be connected to fluid lines in a vehicle or other structure having fluid lines, the parameters of which are desired to be sensed, each of said ports including a valve seat and a valve resiliently urged against the corresponding one of said valve seats, each of said valves selectively blocking the passage of fluid outwardly from the related one of the fluid lines through the related port;

a transducer block having a plurality of fluid-to-electrical transducers disposed therein said transducer block adapted for engagement with said port block, said transducer block having a fluid passage in fluid communication with each of said fluid-to-electrical transducers disposed for alignment and fluid communication with the corresponding ports of said port block when said two blocks are mutually engaged, said transducer block having a plurality of pushers, one for each of said ports, each operative to disengage a corresponding one of said resiliently seated valves away from the corresponding valve seat when said blocks are mutually engaged, thereby to open said fluid lines into fluid communication with said ports, and thereby with said passages and transducers, only when said blocks are mutually engaged;

a cable disposed to said transducer block independently of said port block including a plurality of electrical connections to respective ones of said fluid-to-electrical transducers; and means for releasably securing said blocks in mutual, aligned engagement, whereby said transducers are electrically connected via said cable irrespective of mutual engagement of said blocks but fluid connection between said transducers and said lines is selectively made only through the releasable mutual, aligned engagement.

2. The combination according to claim 1 wherein said means for releasably securing said two blocks in mutual, aligned engagement comprises a rotatable shaft having a protrusion extending from one end thereof, said port block having a keyway for receiving said protrusion with said shaft oriented in a particular direction, said port block also having a groove to allow rotation of said shaft to place said protrusion in directions other than said particular direction, said shaft having at another end thereof a handle means pivotably disposed thereon, said handle means including a cam surface adapted for engagement with a surface disposed on said transducer block in a manner for movement of said handle means to draw said transducer block snugly against said port block with said protrusion engaged in said slot.

3. The combination according to claim 1 wherein said transducer block includes a plurality of inserts adapted to receive a corresponding one of the transducers, each of said inserts having a related one of said pushers disposed thereon.

* * * * *

UNITED STATES PATENT AND TRADEMARK OFFICE
CERTIFICATE OF CORRECTION

PATENT NO. : 4,108,008
DATED : August 22, 1978
INVENTOR(S) : Terence W. Jowett, Harvey A. Smith It is certified that error appears in the above-identified patent and that said Letters Patent are hereby corrected as shown below:

Abstract, line 5    "container" should read --containing--

Column 1, line 27   "varius" should read --various--

Column 3, line 26   "set" should read --seat--

Signed and Sealed this

Twenty-fourth Day of April 1979

[SEAL]

Attest:

RUTH C. MASON
Attesting Officer

DONALD W. BANNER
Commissioner of Patents and Trademarks